Figure 3:
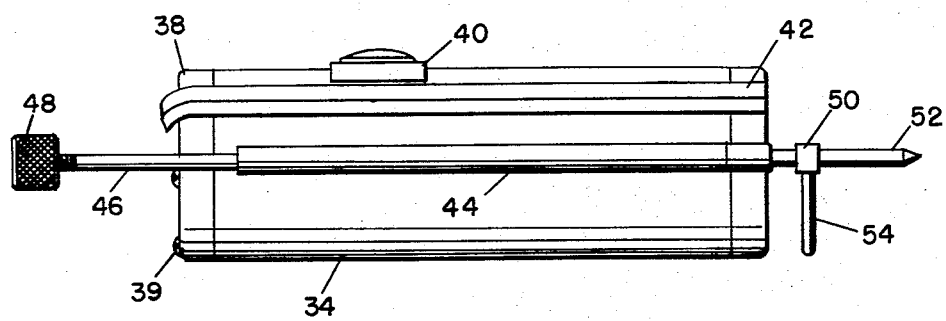

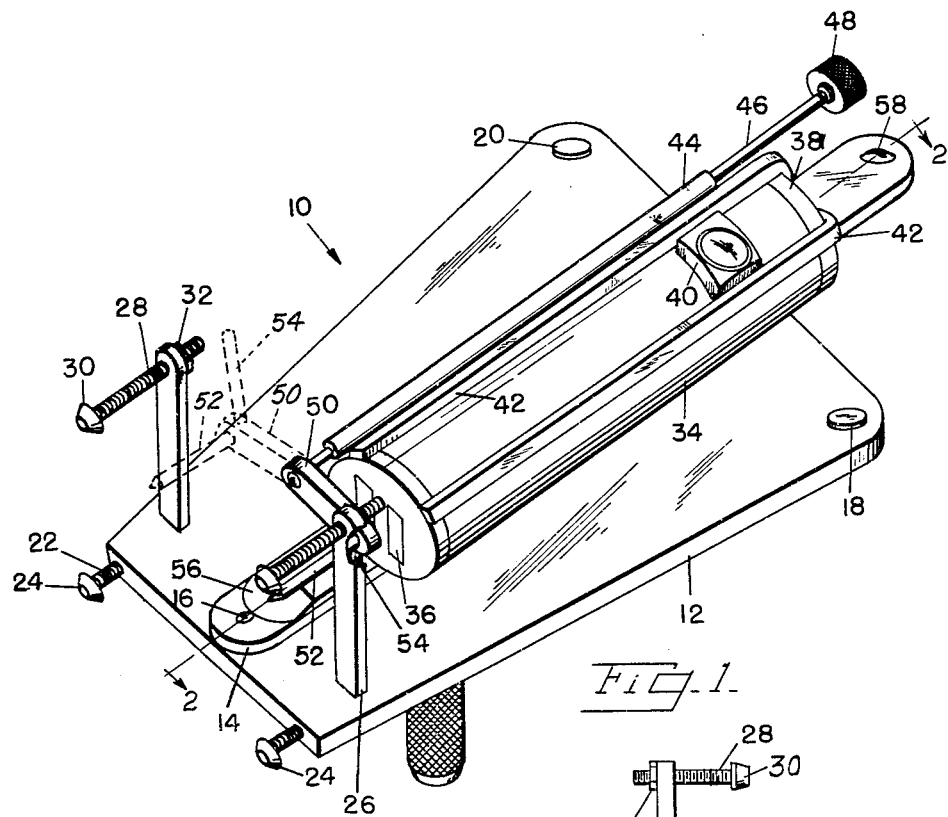

Sept. 15, 1964                F. E. DUDLEY                3,149,197
                    MOTOR VEHICLE LIGHT TESTING APPARATUS
Filed May 25, 1960                                    3 Sheets-Sheet 2

INVENTOR
FRANK E. DUDLEY

INVENTOR
FRANK E. DUDLEY

United States Patent Office 3,149,197
Patented Sept. 15, 1964

3,149,197
MOTOR VEHICLE LIGHT TESTING APPARATUS
Frank E. Dudley, 12 Center St., Westmont, N.J.
Filed May 25, 1960, Ser. No. 31,592
9 Claims. (Cl. 88—14)

This invention relates generally to a means for testing the intensity of illumination of a lighting device and more particularly to a device for testing the light output of tail lights on motor vehicles, trailers and such.

With the constantly increasing number of motor vehicles in use in this country today and the steadily increasing speed at which these motor vehicles travel, safety has become a prime concern, not only to every individual but to all state and federal enforcing agencies responsible for the prevention of injury and death to the citizens involved. Night traffic, in particular, presents one of the greatest problems in maintaining safety and reducing the ever increasing number of accidents occurring on the highways. A primary concern in night driving is the means of illumination used on the vehicle both to the front and to the rear of the vehicle.

Substantial progress has been made in the improvement and testing facilities for head lamps used on all motor vehicles. Many states have regulations which provide for annual or semi-annual inspections of the alignment and proper light output of such head lamps. However, statistics show that one of the major causes of accidents on highways wherein a high rate of speed is a normal procedure, such as turnpikes, is the failure or inadequacy of the light output of the tail lamps used on the motor vehicles. It is obvious that, as roads are improved, and the permissible speed is increased, it is essential that these tail lamps be in proper working condition and provide the necessary illumination to warn overtaking vehicles.

Although specific standards have been established for tail light intensity outputs, to my knowledge no satisfactory means has been provided for testing the tail lamps on the vehicles to ascertain if they actually meet these standards. Of necessity, such a testing device should be of a minimum size and weight so as to be portable and, therefore, capable of being used by the enforcing authorities to make spot checks on particular vehicles, in the field. Such tests could determine the effectiveness of tail lamps at the scene of accidents and, particularly, in accidents which resulted from an overriding vehicle colliding with the rear of another vehicle.

Accordingly, it is an object of this invention to provide a light weight portable device for testing the adequacy of illumination of tail lamps on motor vehicles.

Another object of this invention is to provide a tail lamp testing device which may be calibrated from a standard or master tail lamp.

Yet another object of this invention is to provide a lamp testing device which may be used quickly and easily by any person without the necessity of any special knowledge or training.

A further object of this invention is to provide a tail lamp testing device which will measure the illuminating properties of the lamp in a substantial arc about said lamp.

A still further object of this invention is to provide a tail lamp testing device which provides an illuminating source from the tail lamp itself for reading the meter.

Another object of this invention is to provide a lamp testing device which comprises a minimum number of parts, is inexpensive to produce and is easy to maintain and repair.

Figure 4:
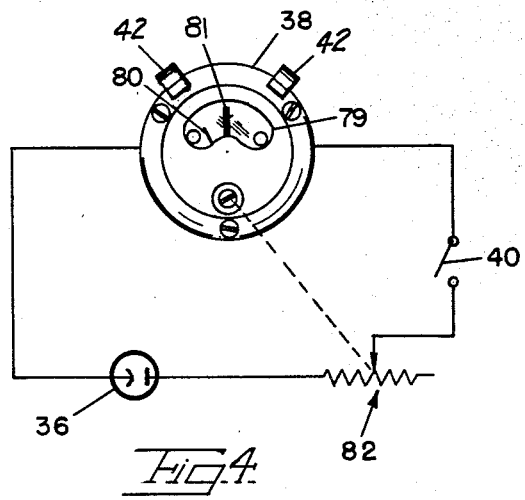
Figure 5:
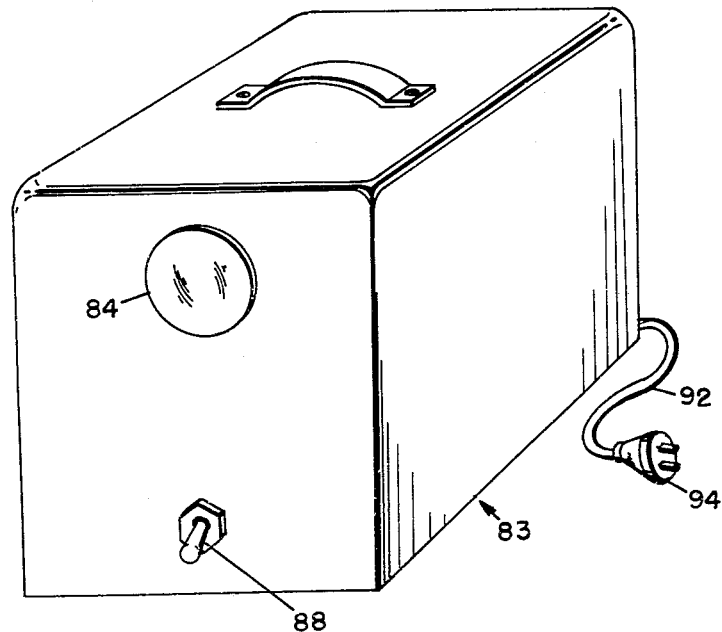
Figure 6:
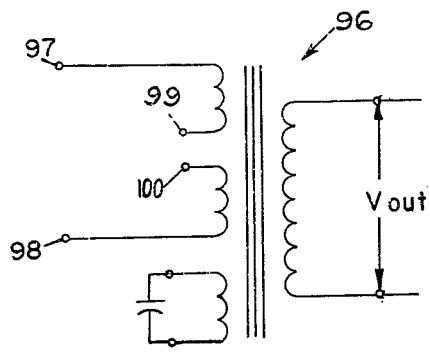

The above and other objects of this invention as well as the construction and operation of the same will best be understood from the following description taken in connection with the accompanying drawings wherein:

FIG. 1 is a perspective view of the portable testing device of the invention;
FIG. 2 is a sectional view of the device taken along the lines 2—2 of FIG. 1 with the meter portion removed;
FIG. 3 is an elevation view of the meter portion of the device and the associated apparatus;
FIG. 4 is a view of the meter face together with the diagrammatic showing of the electrical connections to the meter;
FIG. 5 is a perspective view of the standard or master device used in calibrating the testing device of FIG. 1; and
FIG. 6 is a diagrammatic showing of the voltage regulator used in FIG. 5.

Referring now to FIG. 1, the testing device is mounted on a base plate 12 having a generally trapezoidal face. In order to provide a movable means on which a meter may be mounted, a flat bar member 14 is pivoted at the forward part of plate 12 by means of a rivet or screw 16 or the like. The flat bar member is rotatable about the pivot point 16 between two stop members 18 and 20 which may be riveted or welded to base plate 12. To further provide an adjustment along the axis of the flat bar 14 a second bar member 56 is movably mounted on bar 14 in a manner which will become evident as the description of the device proceeds.

Means are provided on the forward or smaller dimension of the plate 12 for properly maintaining the device in abutting relationship with the lens of the lamp to be tested. The lower part of the lens to be tested is contacted by two rubber tips 24 which are secured to two screw members 22 whose length may be adjusted by moving them into or out of threaded openings in the forward end of base plate 12. In order to provide an abutting means for the upper part of the lens in alignment with the rubber tip members 24, parallel posts 26 are mounted perpendicular to plate 12 at the forward end of the plate. Posts 26 may be secured to the plate in any manner such as by welding or by bolt members 27 as shown in FIG. 2. A threaded opening is provided in the upper portion of each of the posts 26 to receive an adjustable screw 28 having a rubber tip 30 mounted thereon. Lock nuts 32 are provided for maintaining screws 28 in position after the necessary alignment has been obtained.

The light testing instrument portion of the device is mounted on movable bar member 56. Photoelectric cell or cells 36 are located in the forward end of the tubular enclosure 34 to provide the necessary voltage for activating the meter 38 in the rear of the tubular casing shown in FIG. 4. In order to prevent damage to the light cell or cells 36, a push button switch 40 is provided whereby the meter is activated only when the actual test is being made. Standard connections (not shown) are made between the photosensitive cell or cells 36 and the meter 38 through the push button actuated switch 40. Since this testing equipment will be used normally at night, light conducting rods 42 made of translucent light conducting materials such as are sold under the trademark Lucite are mounted on the tubular casing 34 and extend from its forward end to its rear end and are curved in the direction of the meter 38 so as to provide sufficient illumination to read the meter. These light conducting rods 42 eliminate the necessity of additional light means such as a flashlight.

In addition to the abutting means 24 and 30, an aligning rod 52 is provided in order to assure that the abutting means are all approximately equidistant from the source of light being tested and that the photosensitive cell or cells 36 are properly positioned. In order that the aligning rod 52 may be moved axially of the tubular casing 34 when the meter is actually being used, a hollow cylindrical element 44 is secured to the side of casing 34 and has a rod 46 passing therethrough. This rod 46 is both rotatable and slidable within the cylinder 44. Rod 46 extends a substantial distance beyond the rear part of enclosure 34 and is provided with a knurled knob 48 for use by the operator of the device. Rod 46 is keyed or otherwise secured perpendicularly to one end of a link member 50 with the aligning rod 52 being secured near the other end thereof. A support member 54, indicated beyond the broken-away portion of support 26 in FIG. 1, extends downwardly from the link 50 to provide a support for the member 50 and to insure that the rod 52 is aligned substantially along the axis of the casing 34 when the device is in aligned operative position.

When the device is being used the rubber tip members 24 and 30 are placed against the lens of the lamp to be tested. The aligning member 52 is then swung into the position shown in solid lines in FIG. 1 and brought forward to the lens by sliding the rod 46 through the cylinder 44 so as to center the extended end of the aligning rod 52 on the axis of the lamp to be tested. After such alignment, the aligning rod 52 is moved rearwardly and is rotated to the position shown by the dotted lines of FIG. 1 so that it will not interfere with the light reception of the photosensitive cells 36.

Tail lighting standards which have been developed and recommended by the Society of Automobile Engineers are known as SAE Standards No. TR–34. The standards require a certain minimum illumination when measured from an angle of 20° from either side of the axis of the lamp structure. Accordingly, the stops 18 and 20 provide a 20° angle between the axis of the tubular element 34 and the axis of the tail lamp assembly when the bar member 14 is in abutment with either of the stops 18 and 20.

FIG. 2 shows the structure of the supporting means for the light testing instrument portion of the device. In order to provide a means for holding the device while it is being used, a cylindrical member 66 subtends from the base plate 12 at the underside thereof. A threaded portion 68 of smaller diameter projects downwardly of the member 66 and carries a depending flat tongue member 70. A cylindrical handle member 72 has extending upwardly therefrom a reduced threaded cylindrical portion 75 having opposed flat plates 76 extending therefrom in a saddle arrangement. Tongue 70 fits between the saddle members 76 and is pivotally secured thereto by means of a rivet 77 or the like. An annular collar 78, internally threaded, is theadedly secured to the fixed member 68 when in the position shown by the dotted lines in FIG. 2 so as to interlock the handle member 72 to the cylindrical member 60 whereby to provide means for supporting the device in upright operative position. The structure described above is provided in order that the handle means may be folded by unscrewing collar memebr 78 and sliding it downwardly over the cylindrical portion 75, whereby the handle member 72 may be folded in a parallel position to the base plate 12. This arrangement allows the device to be carried in a box of substantially smaller dimensions than if the handle means were fixed and provides general compactness when the device is not in use.

Slots 61 and 63 are provided in the adjustable plate 56. Screw members 60 and 65, having heads thereon of a diameter greater than the width of slots 61 and 63, are threaded into the bar member 14. When the screws 60 and 65 are tightened the adjustable plate member 56 is held firmly in position. By loosening the screws 60, plate member 56 may be moved along bar 14 through a distance provided by the length of the slots 61 and 63. The advantage of this adjustable feature will become apparent as the description proceeds. Screws 62 extend upwardly through bar 56 and secure the tubular casing 34 to the adjustable bar 56 which is, therefore, movable therewith. The construction shown provides for removal of the casing 34 if repair or replacement of the testing instrument is desired. As can be seen, forward screw 60 can be removed and the rear screw 65 can be loosened, whereby the adjustable bar member 56 can be rotated about screw 65. This will provide access to screws 62 and removal of casing 34.

FIG. 3 shows a side view of the testing instrument removed from the base and indicates the relative arrangement of the switch member 40, the light conducting rods 42 and the aligning rod 52 together with its operating means.

FIG. 4 shows a view of the meter together with a diagrammatic showing of the electrical circuitry involved therewith. The meter 38 is provided with a meter face 79, an indicator 80 and a center marker 81 which marks the minimum requirements as set forth by the above mentioned standards. The meter is initially calibrated by means of adjustable resistor 82, controlled by the adjustable screw member, to approximate the required range of operation. The photoelectric cell 36 and the button actuated switch 40 are diagrammatically shown to complete the circuit.

FIG. 5 shows the standard or master device 83 which is used for calibrating the instrument described in connection with FIGS. 1 through 4. A standard tail lamp and lens are mounted on the forward part of the master device 83. Also provided are standard off-on switch 88 and a cord 92 and plug 94. The voltage regulator shown diagrammatically in FIG. 6 is provided within the master device of FIG. 5 to supply a standard designated voltage to tail lamp 84 regardless of line input voltage fluctuations. This voltage regulator may be any standard well-known regulator and, as can be seen, has terminals 97, 98, 99 and 100 for an input of either a standard two wire 90–130 volt A.C. 60 cycle input or a standard three wire 190–260 volt A.C. 60 cycle input. The output voltage is supplied to the tail lamp and would normally be a 6.3 volt A.C. 60 cycle output.

The master device 83 is provided in order that the actual testing device may be easily calibrated at regular intervals, preferably before it is to be used by the particular enforcing officer or authority. The device 83 serves as a standard adjusting means by placing the testing device against the tail lamp 84 and aligning it in a manner similar to that described above in the actual testing procedure. The standard tail lamp is designed to provide the minimum illumination at twenty degree angle under the recommended requirements mentioned above. This minimum requirement is represented by the mark 81 on the meter face. Knowing that the standard tail lamp of the master device is in proper working order, the testing device may be adjusted so that the indicator 80 will be on or slightly above the marker 81 when the bar 14 abuts against either stop 18 or 20. The screws 60 and 65 of the adjustable plate 56 may be loosened and the assembly moved either closer to or away from the standard tail lamp 84 in order to produce the desired reading on the meter. This calibration further provides a means for ascertaining that the meter itself is in proper working condition before it is used by the authorities.

As can be seen, a relatively inexpensive and uncomplicated device has been provided to fill a very important safety need which heretofore has not been available. To my knowledge the only method of testing tail lamps has been to remove the actual lamp and send it to a central laboratory and have it tested in that manner. Such a procedure is costly and time consuming and, further, raises doubts as to the relative condition of the lamp assembly prior to removal from the vehicle as compared to the condition of the lamp when it was actually tested in the laboratory. With the device of the present invention the tail light assembly tested exacly as it appears and operates on the vehicle which is undergoing the test.

While I have shown a preferred embodiment of the testing device and the method used for testing, it will be understood by those skilled in the art that the invention is not limited to the specific structure shown since various configurations of the testing device and the supporting means therefore could be altered without departing from the scope of my invention.

I claim:

1. A device for testing a vehicle tail light having a lens comprising a substantially flat base having a foldable handle on one face thereof, a movable member pivotally mounted on the other face at one end of said base, a light meter including photosensitive means mounted on said member, said light meter being slidably adjustable to various positions with respect to said member, adjustable abutting means mounted on said other face of said base at one end thereof for contacting said lens, a centering device movably mounted on said light meter, and means for limiting the movement of said movable member.

2. A device for measuring the intensity of light passing through a lens comprising a base member, a plate pivotally mounted on said base member at one end thereof, a bar member mounted for slidable adjustment on said plate, a light meter including photosensitive means mounted on said bar member, abutting means mounted on said base member forward of said light meter for contacting said lens, and centering means movably mounted on said meter for aligning said meter with respect to said lens.

3. The apparatus of claim 2 further comprising light conductive means mounted on said meter for directing light onto the face of said meter.

4. A device for testing a light including a lens comprising a base, a plate pivotally mounted at one end of said base and extending beyond the other end of said base, stop means for limiting the movement of said plate about said pivot, adjustment means slidably positioned on said plate, a light meter including photosensitive means secured to said adjustable means, adjustable abutting means mounted at said one end of said plate for contacting said lens and rotatable centering means mounted on said meter for aligning said meter with respect to said lens.

5. A device for testing a light having an enclosure and lens comprising a base, a first plate pivotally mounted on said base at one end thereof, a second plate slidably mounted on said first plate, an enclosure mounted on said second plate, photosensitive means mounted in one end of said enclosure, a meter mounted in the other end of said enclosure and operated by said photosensitive means, adjustable abutting means mounted on said base for contacting said lens and adjustable means mounted on said enclosure and extending between said lens and said photosensitive means for aligning said enclosure with respect to said lens.

6. The apparatus of claim 5 wherein said adjustable means comprises a rotatable and slidable rod mounted on the side of said enclosure and an aligning bar secured to one end of said rod.

7. The apparatus of claim 5 further comprising at least one light conducting element secured to said enclosure between said ends thereof for directing light onto said meter.

8. A device for testing the light output of a light source through a lens comprising a base, a light meter including photosensitive means pivotally secured to said base at one end thereof, movable means secured to said meter for aligning said meter along the axis of said lens, a plurality of substantially parallel independently adjustable members secured to said base for contacting said lens and means slidably adjusting said light meter with respect to said adjustable members for calibrating said meter with respect to a predetermined fixed light source.

9. A device for testing the light output of a light source through a lens comprising a base, a light meter including photosensitive means pivotally secured to said base at one end thereof, a slidable and rotatable rod mounted on said light meter and an aligning bar secured to one end of said rod for aligning said meter along the axis of said lens, abutting means secured to said base for contacting said lens and means slidably adjusting said light meter with respect to said abutting means for calibrating said meter with respect to a predetermined fixed light source.

References Cited in the file of this patent

UNITED STATES PATENTS

| | | |
|---|---|---|
| 1,967,583 | McFarlane et al. | July 24, 1934 |
| 1,976,270 | Urfer | Oct. 9, 1934 |
| 2,167,803 | Graham et al. | Aug. 1, 1939 |
| 2,215,224 | MacMillan | Sept. 17, 1940 |
| 2,261,741 | Mathieu | Nov. 4, 1941 |